(12) United States Patent
Lee

(10) Patent No.: US 6,459,465 B1
(45) Date of Patent: Oct. 1, 2002

(54) LIQUID CRYSTAL PANEL FOR IPS MODE LIQUID CRYSTAL DISPLAY DEVICE AND METHOD FOR FABRICATING THE SAME

(75) Inventor: Yun-Bok Lee, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/014,518

(22) Filed: Dec. 14, 2001

(30) Foreign Application Priority Data

Dec. 15, 2000 (KR) .................................. 2000-0076879

(51) Int. Cl.⁷ ............................................. G22F 1/136
(52) U.S. Cl. ........................ 349/141; 349/110; 349/111
(58) Field of Search ................................. 349/141, 110, 349/111

(56) References Cited

U.S. PATENT DOCUMENTS

| | | | |
|---|---|---|---|
| 5,598,285 A | 1/1997 | Kondo et al. | 349/39 |
| 5,786,876 A | * 7/1998 | Ota et al. | 349/110 |
| 5,838,037 A | 11/1998 | Masutani et al. | 257/296 |
| 5,907,379 A | * 5/1999 | Kim et al. | 349/110 |
| 5,946,060 A | 8/1999 | Nishiki et al. | 349/48 |
| 5,990,987 A | 11/1999 | Tanaka | 349/43 |
| 5,995,182 A | * 11/1999 | Watanabe et al. | 349/110 |
| 6,028,653 A | 2/2000 | Nishida | 349/141 |
| 6,097,454 A | 8/2000 | Zhang et al. | 349/43 |
| 6,266,117 B1 | * 7/2001 | Yanagawa | 349/110 |

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro-Optical Behaviour with In–Plane Switching Mode"; Asia Display '95; pp. 577–580.
M. Ohta et al.; "Development of Super–TFT–LCDs with In–Plane Switching Display Mode"; Asia Display '95; pp. 707–710.
S. Matsumoto et al.; Display Characteristics of In–Plane Switching (IPS) LCDs and a Wide–Viewing–Angle 14.5–in. OPS TFT–LCD; Euro Display '96; pp. 445–448.
H. Wakemoto et al.; "An Advanced In–Plane Switching Mode TFT–LCD"; SID 97 Digest; pp. 929–932.
S.H. Lee et al.; High–Transmittance, Wide–Viewing–Angle Nematic Liquid Crystal Display Controlled by Fringe–Field Switching; Asia Display '98; pp. 371–374.

* cited by examiner

*Primary Examiner*—James Dudek
(74) *Attorney, Agent, or Firm*—McKenna Long & Aldridge LLP

(57) ABSTRACT

A liquid crystal panel for in-plane switching (IPS) mode liquid crystal display device has a common electrode and a pixel electrode made of transparent conductive material to increase an aperture ratio and brightness. Second common electrodes and second pixel electrodes are formed in substantially zigzag patterns, which results in a symmetric alignment of liquid crystal in order to increase a viewing angle and a color shift. A black matrix may be formed on an upper substrate independent of a gate line and a data line or the black matrix may be formed by extending the gate line or the data line.

38 Claims, 8 Drawing Sheets

LIQUID CRYSTAL PANEL FOR IPS MODE LIQUID CRYSTAL DISPLAY DEVICE AND METHOD FOR FABRICATING THE SAME

This application claims the benefit of Korean Patent Application No. 2000-76879, filed on Dec. 15, 2000 in Korea, which is hereby incorporated by reference as if fully set forth herein.

BACKGROUND OF THE INVENTION

1. Field of the Invention

The present invention relates to a liquid crystal display (LCD) device, and more particularly to a liquid crystal panel for a liquid crystal display device implementing In-Plane Switching (IPS) wherein electric field applied to liquid crystal is generated in a plane parallel to a substrate.

2. Discussion of the Related Art

A typical liquid crystal display (LCD) device uses optical anisotropy and polarization properties of liquid crystal molecules. The liquid crystal molecules have a definite orientation order in alignment resulting from their thin and long shapes. The alignment direction of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

By now, active matrix LCDs, in which the thin film transistors and the pixel electrodes are arranged in the form of a matrix, are widely used because of their high resolution and superiority in displaying moving images.

FIG. 1 is an exploded perspective view illustrating a typical liquid crystal display device. As shown in the figure, the typical liquid crystal display device includes an upper substrate 5 and a lower substrate 22 and a liquid crystal layer 14 interposed between the upper and lower substrate. A color filter 7 including black matrices 6 and sub-filters 8 are formed on the upper substrate 5, and a transparent common electrode 18 is formed on the color filter 7. On the other hand, a pixel region "P", a pixel electrode 17 in the pixel region "P" and an array line including switching element, i.e., thin film transistor, are formed on the lower substrate 22. The lower substrate 22 is referred to as an array substrate 22 and a plurality of thin film transistors "T", i.e., switching element, is formed at every crossing of horizontal gate lines 13 and vertical data lines 15 in a form of an array matrix. The pixel region "P" is defined by a gate line 13 and a data line 15 crossing each other. A transparent conductive material such as indium tin oxide (ITO) is used for the pixel electrode 17 formed in the pixel region "P". The liquid crystal layer 14 comes to be aligned according to a signal applied thereto by the thin film transistor "T". An image may be displayed by controlling an amount of light transmitting the liquid crystal layer 14 according to the alignment of the liquid crystal layer.

The above-mentioned liquid crystal display device, in which the liquid crystal is aligned by an electric field applied vertically, has advantages of high transmittance and high aperture ratio. Furthermore, since the common electrode on the upper substrate serves as an electrical ground, the liquid crystal is protected from a static electricity. However, the above-mentioned liquid crystal display device applying the electric field vertically to the liquid crystal has a disadvantage of a narrow viewing angle. To overcome the narrow viewing angle, an in-plane switching (IPS) LCD panel was developed. The IPS LCD panel implements an electric field that is parallel to the substrates, which is different from the Twisted Nematic (TN) or Super Twisted Nematic (STN) LCD panel. A detailed explanation about operation modes of a typical IPS LCD panel will be provided with reference to FIGS. 2, 3A, 3B, and 4.

As shown in FIG. 2, the upper and lower substrates 5 and 22 are spaced apart from each other, and a liquid crystal is interposed therebetween. The upper and lower substrates 5 and 22 are called a color filter substrate and an array substrate, respectively. Pixel and common electrodes 17 and 18 are disposed on the lower substrate 22. The pixel and common electrodes 17 and 18 are parallel with each other and spaced apart from each other. The liquid crystal 14 is aligned by a lateral electric field between the pixel and common electrodes 17 and 18.

FIGS. 3A to 3B are views illustrating operations of the liquid crystal for IPS mode at on and off state of a voltage applied. FIG. 3A conceptually illustrates "off state" operation modes for a typical IPS LCD device. In the off state, the long axes of the liquid crystal molecules maintain a definite angle with respect to a line that is perpendicular to the pixel and common electrodes 17 and 18. The pixel and common electrode 17 and 18 are parallel with each other. Herein, the angle difference is 45 degrees, for example.

FIG. 3B conceptually illustrates "on state" operation modes for the typical IPS LCD device. In the on state, an in-plane electric field, which is parallel with the surface of the lower substrate 22, is generated between the pixel and common electrodes 17 and 18. The reason is that the pixel electrode 17 and common electrode 18 are formed together on the lower substrate 22. The liquid crystal molecules are twisted such that the long axes thereof coincide with the electric field direction. Thereby, the liquid crystal molecules are aligned such that the long axes thereof are perpendicular to the pixel and common electrodes 17 and 18.

The IPS LCD device uses the lateral electric field 35 because the pixel and common electrodes are formed on the same substrate. The IPS LCD device has a wide viewing angle and low color dispersion. Specifically, the viewing angle of the IPS LCD device is about 70 degrees in direction of up, down, right, and left. In addition, the fabricating processes of this IPS LCD device are simpler than other various LCD devices. However, because the pixel and common electrodes 17 and 18 are disposed on the same plane of the lower substrate, the transmittance and aperture ratio are low. In addition, the IPS LCD device has disadvantages of a relatively slow response time and a relatively small alignment margin of a cell gap. Because of the small alignment margin of a cell gap, the IPS LCD device needs a uniform cell gap. The IPS LCD device has the above-mentioned advantages and disadvantages. Users may or may not select an IPS LCD device depending on the intended use.

Now, with reference to FIGS. 4, and 5A to 5D, a fabricating process for a conventional IPS LCD device is provided. FIG. 4 is a plan view illustrating a unit pixel region "P" of a conventional IPS LCD device. As shown, a gate line 50 and a common line 54 are arranged parallel to each other, and a data line 60 is arranged perpendicular to the gate and common lines 50 and 54. Near a cross point of the gate and data lines 50 and 60, a gate electrode 52 and a source electrode 62 are disposed. The gate and source electrodes 52 and 62 integrally communicate with the gate line 50 and the data line 60, respectively. The source electrode 62 overlaps a portion of the gate electrode 52. In addition, a drain electrode 64 is disposed opposite to the source electrode 62 with an interval between the source and drain electrodes.

A plurality of common electrodes 54a are disposed perpendicular to the common line 54 and connected to the common line 54. The plurality of common electrodes 54a are spaced apart from each other with an equal interval between. A first connecting line 66 integrally communicates with the drain electrode 64. A plurality of pixel electrodes 66a are disposed perpendicular to the first connecting line 66. First ends of the pixel electrodes 66a are connected with the first connecting line 66, and the second ends of the pixel electrodes 66a are connected with a second connecting line 68 that is disposed over the common line 54. The plurality of common electrodes 54a and the pixel electrodes 66a are spaced apart from each other and arranged in an alternating pattern. Therefore, each common electrode 54a is parallel to an adjacent pixel electrode 66a.

FIGS. 5A to 5D are cross-sectional views taken along "V—V" of FIG. 4 illustrating a sequence of fabricating processes for an array substrate 22 of the above-mentioned IPS LCD device.

In FIG. 5A, a first metal layer is deposited on the array substrate 22 and patterned to form the gate electrode 52 and the plurality of common electrodes 54a. The first metal layer may be selected from a group consisting of chromium (Cr), aluminum (Al), aluminum alloy (Al alloy), for example.

In FIG. 5B, a gate insulating layer 70 is formed on the array substrate 22 to cover the gate and common electrodes 52 and 54a. An active layer 72 is formed on the gate insulating layer 70 over the gate electrode 52. Silicon nitride (SiNx), for example, may be used for the gate insulating layer 70, while the active layer 72 includes an amorphous silicon layer (not shown) and a doped amorphous silicon layer (not shown).

In FIG. 5C, a second metal layer is deposited and patterned to form the source and drain electrodes 62 and 64 on the active layer 72 and the pixel electrodes 66a on the gate insulating layer 70. The pixel electrodes 66a are spaced apart from the adjacent common electrode 54a by a distance "L".

In FIG. 5D, a passivation layer 74 is formed to cover the source, drain, and pixel electrodes 62, 64, and 66a. The passivation layer 74 serves to protect the source, drain, and pixel electrodes 62, 64, and 66a from exterior humidity or contaminants.

As described above, the common and pixel electrodes 54a and 66a of the IPS LCD device are arranged in the same plane such that an in-plane electric field is applied parallel with the substrate 22. Though the IPS LCD device has an advantage of a wide viewing angle, the aperture ratio and luminance of the IPS LCD panel are much lower than that of the twisted nematic (TN) or super twisted nematic (STN) LCD device.

SUMMARY OF THE INVENTION

Accordingly, the present invention is directed to an in-plane switching (IPS) mode liquid crystal display device and a method for fabricating the same that substantially obviates one or more of problems due to limitations and disadvantages of the related art.

An advantage of the present invention is to provide an in-plane switching liquid crystal display device that improves an aperture ratio and brightness as well as a viewing angle.

Another advantage of the present invention is to provide a fabricating method for an in-plane switching liquid crystal display device that improves the aperture ratio and the brightness.

Another advantage of the present invention is to provide an in-plane switching liquid crystal display device that further improves the aperture ratio and the brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching liquid crystal display device comprises first and second substrates, a gate line and a data line defining a pixel region on the first substrate, a common line on the first substrate, a thin film transistor at a crossing portion between the gate line and the data line, a first pixel electrode and a plurality of second pixel electrodes on the first substrate, a first common electrode and a plurality of second common electrodes on the first substrate, a black matrix layer on the second substrate, the black matrix layer having a substantially rectangular shape and being formed between the first pixel electrode and one end of the second common electrode and a liquid crystal layer between the first substrate and the second substrate. The common line is partially overlapped with the data line. The thin film transistor includes gate, source, and drain electrodes. The pixel and common electrodes include a transparent conductive material. The transparent conductive material is one of indium tin oxide (ITO) and indium zinc oxide (IZO). The common line and the data line have a zigzag shape. The pixel and common electrodes have a substantially zigzag shape. The black matrix layer is formed between one end of the second pixel electrode and the first common electrode. The in-plane switching liquid crystal display device further includes a storage capacitor on the gate line. The in-plane switching liquid crystal display device further includes a passivation layer on the thin film transistor. The common and pixel electrodes are formed on the passivation layer.

In another aspect, a method for fabricating an in-plane switching liquid crystal display device includes the steps of forming a gate line and a data line defining a pixel region on a first substrate, forming a common line on the first substrate, forming a thin film transistor at a crossing portion between the gate line and the data line, forming a first pixel electrode and a plurality of second pixel electrodes on the first substrate, forming a first common electrode and a plurality of second common electrodes on the first substrate, forming a black matrix layer on the second substrate, the black matrix layer having a substantially rectangular shape and being formed between the first pixel electrode and one end of the second common electrode and forming a liquid crystal layer between the first and second substrates. The pixel and common electrodes include a transparent conductive material. The transparent conductive material is one of indium tin oxide (ITO) and indium zinc oxide (IZO). The common line and the data line have a substantially zigzag shape. The pixel and common electrodes have a substantially zigzag shape. The black matrix layer is formed between one end of the second pixel electrode and the first common electrode. The method for fabricating an in-plane switching liquid crystal display device further includes the step of forming a storage capacitor on the gate line. The method for fabricating an in-plane switching liquid crystal display device further includes the step of forming a passivation layer on the thin film transistor. The common and pixel electrodes are formed on the passivation layer.

In another aspect, an in-plane switching liquid crystal display device includes first and second substrates, a gate line and a data line defining a pixel region on the first substrate, a common line on the first substrate, a thin film transistor at a crossing portion between the gate line and the data line, a first pixel electrode and a plurality of second pixel electrodes on the first substrate, a first common electrode and a plurality of second common electrodes on the first substrate, a black matrix layer on the first substrate, the black matrix layer being formed between the first pixel electrode and one end of the second common electrode and a liquid crystal layer between the first substrate and the second substrate. The common line is partially overlapped with the data line. The thin film transistor includes gate, source, and drain electrodes. The pixel and common electrodes include a transparent conductive material. The transparent conductive material is one of indium tin oxide (ITO) and indium zinc oxide (IZO). The common line and the data line have a substantially zigzag shape. The pixel and common electrodes have a substantially zigzag shape. The black matrix layer is formed between one end of the second pixel electrode and the first common electrode. The black matrix layer is formed on the same plane of the gate line. The black matrix layer is formed on the same plane of the data line. The in-plane switching liquid crystal display device further comprises a passivation layer on the thin film transistor. The common and pixel electrodes are formed on the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which is illustrated in the accompanying drawings.

Figure 1:
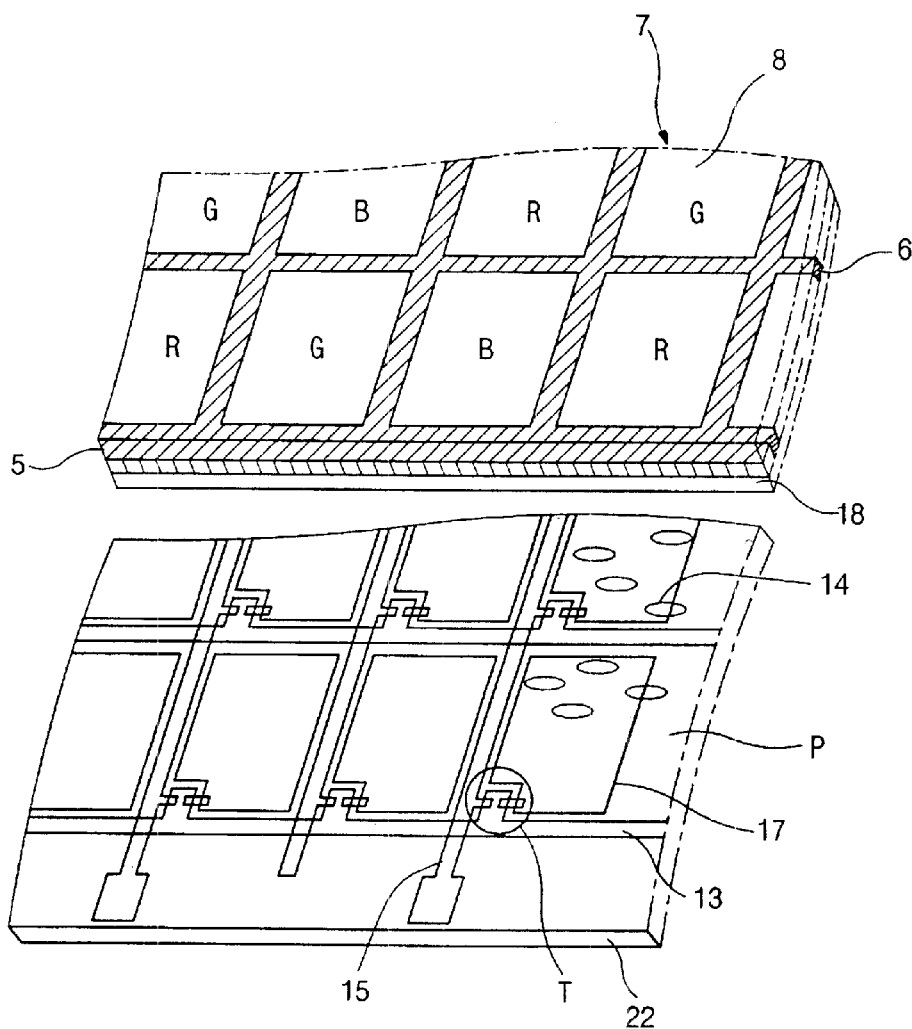
FIG. 1 is an exploded perspective view illustrating a conventional liquid crystal panel for a color liquid crystal display device.
Figure 2:
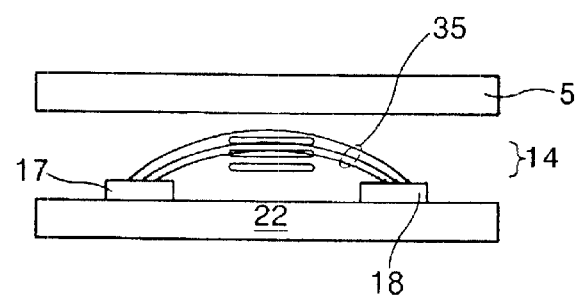
FIG. 2 is a cross-sectional view illustrating a conventional in-plane switching (IPS) mode liquid crystal display device.
Figure 3A:
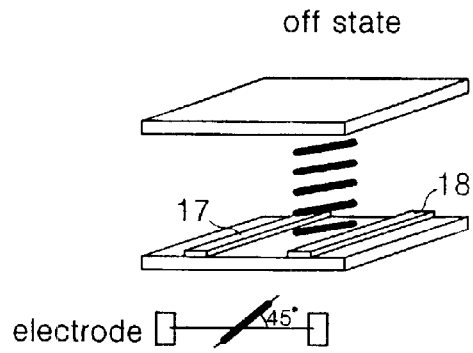
FIG. 3A is a view illustrating an operation of liquid crystal of the conventional inplane switching (IPS) mode liquid crystal display device in an off state.
Figure 3B:
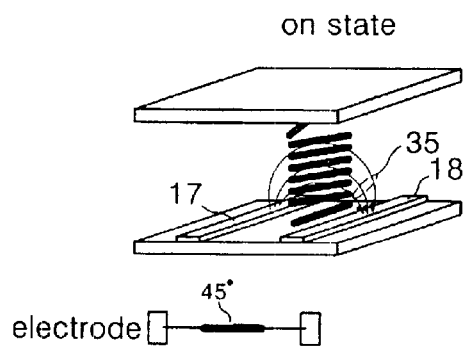
FIG. 3B is a view illustrating an operation of liquid crystal of the conventional inplane switching (IPS) mode liquid crystal display device in an on state.
Figure 4:
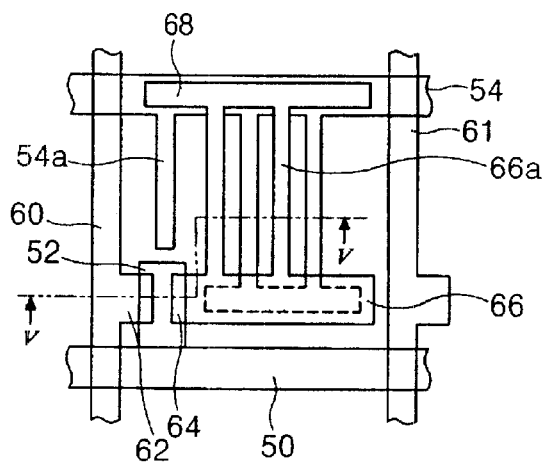
FIG. 4 is a plan view illustrating a pixel of an array substrate for the conventional in-plane switching (IPS) mode liquid crystal display device.
Figure 5A:
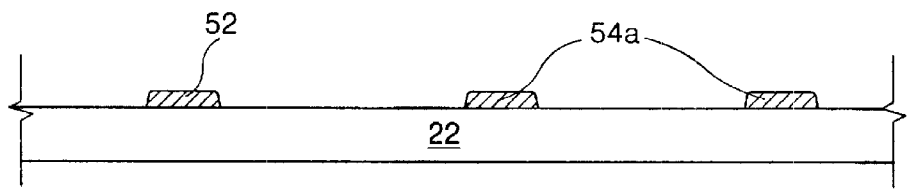
FIGS. 5A to 5D are cross-sectional views taken along V—V of FIG. 4 illustrating a fabricating sequence of an array substrate for the conventional in-plane switching (IPS) mode liquid crystal display device.
Figure 5B:
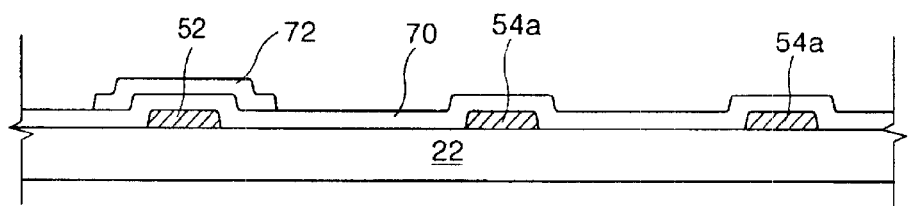
Figure 5C:
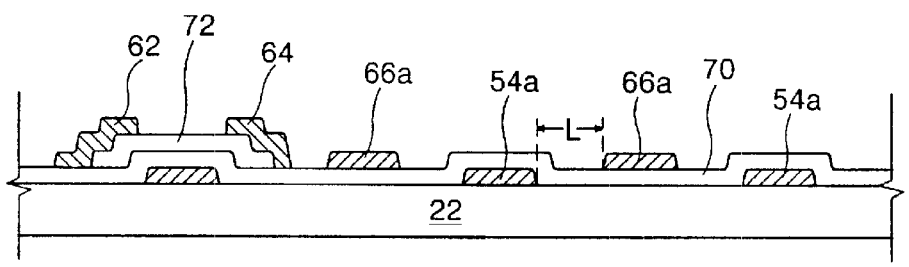
Figure 5D:
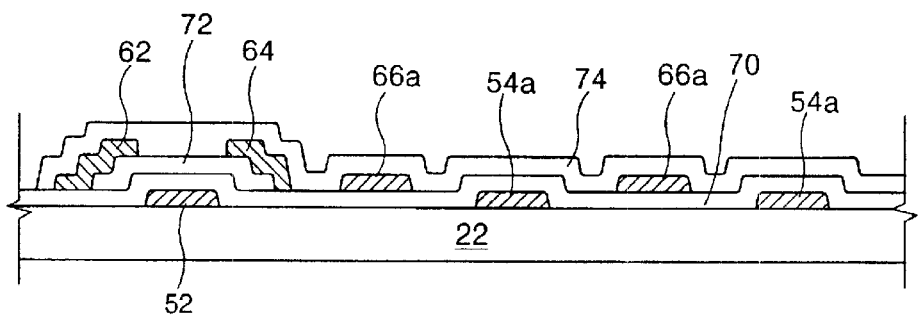
Figure 6:
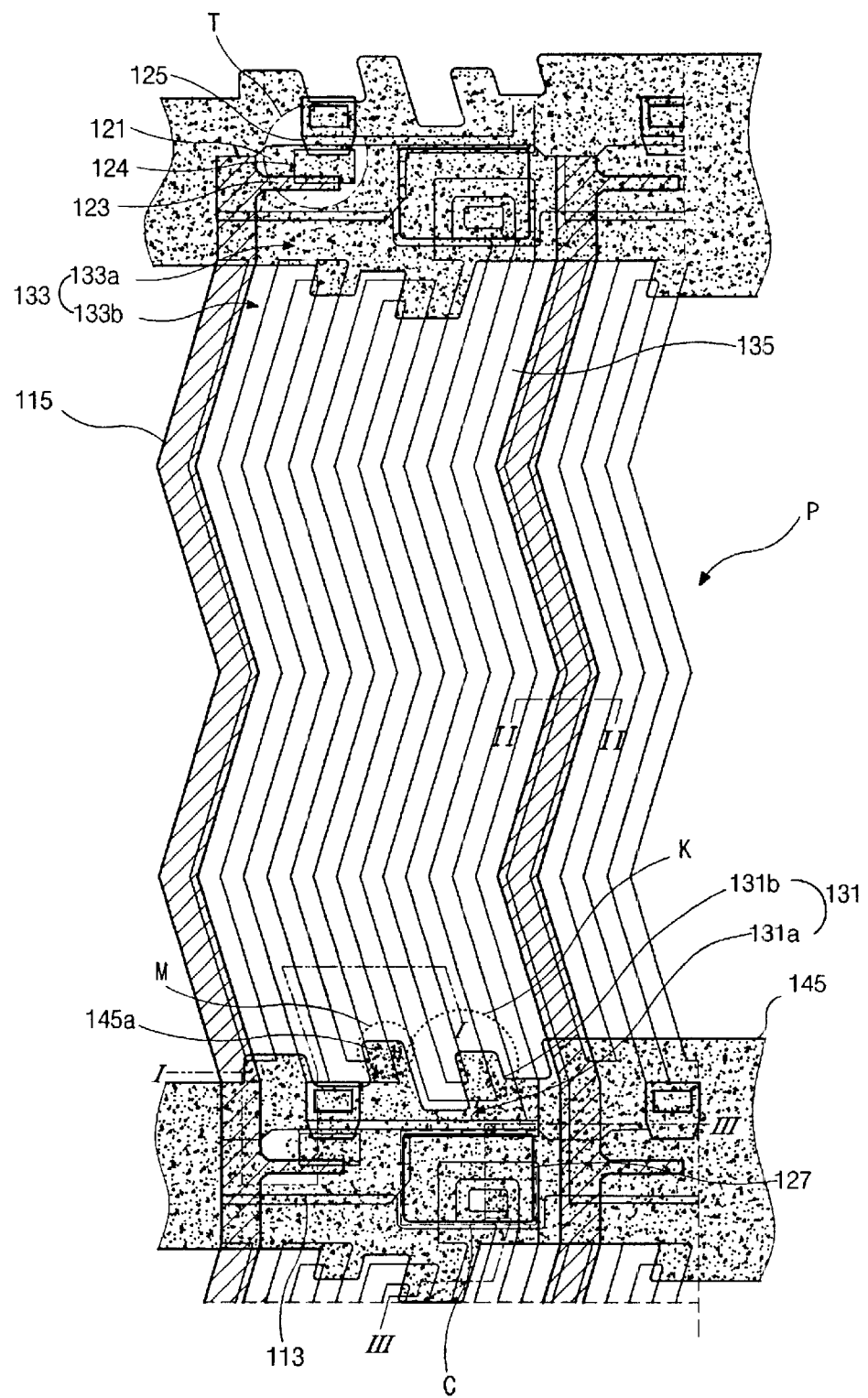
FIG. 6 is a plan view illustrating a part of an array substrate according to a first embodiment of the present invention.

FIG. 6 is a plan view illustrating a part of an array substrate according to a first embodiment of the present invention. As shown in the context of the figure, horizontally extended gate lines 113 and vertically extended data lines 115 define a pixel region "P" by crossing each other. The data line 115 is formed in a substantially zigzag pattern. The thin film transistor including a gate electrode 121, an active layer 124, source and drain electrodes 123, 125 is formed at the crossing of the gate line 113, and the data line 115. A storage capacitor is formed over a part of the gate line 113. The pixel electrode 131 includes a first pixel electrode 131a contacting the drain electrode 125 and a plurality of second pixel electrodes 131b extending from the first pixel electrode 131a. The plurality of second pixel electrodes 131b is formed in a substantially zigzag pattern roughly in parallel with the data line 115. The first pixel electrode 131a is spaced apart from the gate line 113 and parallel to the gate line 113. One of the second pixel electrodes 131b contacts a second storage electrode 127 and thus constitutes the storage capacitor "C" on the gate line 113. The common electrode 133 and the common line 135 extended to the common electrode are formed parallel to the pixel electrode 131. The common electrode 133 includes a first common electrode 133a and a plurality of second common electrodes 133b. The first common electrode 133a is stemmed from the common line 135 and parallel to the gate line 113. The plurality of second common electrodes 133b extends roughly perpendicularly from the first common electrode 133a and is arranged in an alternating order with the second pixel electrodes 131b roughly in parallel with the data line 115. The common line 135, the common electrode 133 and the pixel electrode 131 are formed on a same plane using transparent conductive materials. Thus it is possible to increase an aperture ratio. Electric field directions distributed by the common electrode 133 and the pixel electrode 131 in regions adjacent to the first common electrode 133a and the first pixel electrode 131a respectively show different electric field distributions from those of other regions in a pixel, and thus disclinations caused by abnormal alignments of liquid crystal may be generated in these regions.

Figure 7:
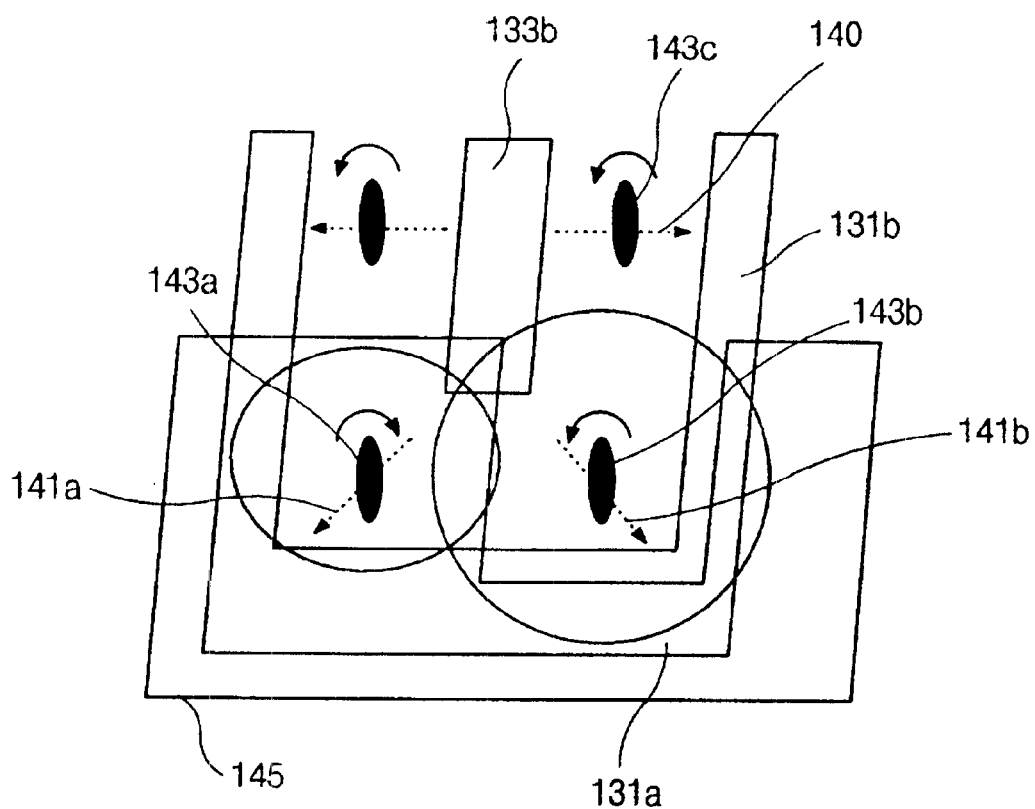
FIG. 7 is an enlarged plan view illustrating a region between a first pixel electrode and a second common electrode where a disclination may be generated.

FIG. 7 is an enlarged plan view of "K" of FIG. 6 illustrating a region between a first pixel electrode 131a and a second common electrode 133b where a disclination may be generated. The common electrode 133 and the pixel electrode 131 are made of same materials as shown in the figure of the second common electrodes 133b and the second pixel electrodes 131b spaced apart from each other. In addition, a short should not occur between the pixel electrodes 131 and the common electrodes 133. Accordingly, there must be a space between the first pixel electrode 131a and the end of the second common electrode 133b and between the first common electrode 133a and the end of the second pixel electrode 131b considering the short circuit margin. Therefore, the direction of the electric field in the regions between the first common electrode (not shown) and the end of second pixel electrode (not shown) and between the first pixel electrode 131a and the end of the second common electrode 133b is different from the direction of the electric field distributed in the middle part of the pixel. The direction of the electric field 141a, 141b in both corners of the space between the first pixel electrode 131a and the end of the second common electrode 133b are symmetric as shown in the figure. Because the liquid crystal molecules have a tendency to rotate in a direction of small angle between an axis of symmetry of the liquid crystal molecules and the electric field, all of the liquid crystal molecules in the middle part of the pixel are inclined to align in a same direction. But the liquid crystal molecules 143a, 143b that are adjacent to both corners of the second pixel electrode 131b and the second common electrode 133b have a tendency to align in mutually opposite directions, as shown in the figure using arrows. Accordingly, one of the liquid crystal molecules 143a, 143b adjacent to both corners of the second pixel electrode may align in a different direction from that of the liquid crystal in the middle part of the pixel. Because transmission properties in the region where the liquid crystal is aligned abnormally are different from those of other regions, the disclination is generated in this region. Therefore, a black matrix 145 may be formed on the upper substrate so that the black matrix can intercept light incident in the region where the disclination is generated. The black matrix 145 has substantially rectangular shaped protrusion 145a, as shown in FIG. 6, and the portion "M" of the black matrix in FIG. 6 intercept the incident light in the region where the disclination is generated. The protrusion 145a of the black matrix 145 is substantially rectangular shaped, and may be slanted to cover the area of disclination to prevent light from passing through areas of disclination. For example, the protrusion 145a may have the shape of a parallelogram that is slanted with respect to the black matrix 145.

One of characteristics of the present invention is that the common electrode 133 and the pixel electrode 131 are formed using transparent conductive materials. Accordingly, because an area that can transmit the incident light can be enlarged, a higher aperture ratio and a higher brightness can be obtained. Because the pixel electrode 131 and the common electrode 133 can be formed parallel in a same plane with the same material, the fabricating process can be simplified and a residual direct current (R-DC), which causes a residual image, can be removed. In addition, because the common electrode 133 and the pixel electrode 131 can be spaced with an uniform distance and thus an uniform lateral electric field distribution can be obtained in the whole pixel area, flicker caused by an irregular electric field distribution can be prevented.

Another characteristic of the present invention is that the common electrode 133 and the pixel electrode 131 are formed in substantially zigzag patterns. Accordingly, the liquid crystal molecules in a pixel are not aligned in a same direction, but in a symmetric directions and thereby multi-domain can be obtained. A color shift phenomenon can be minimized by offsetting abnormal light caused by birefringence properties of the liquid crystal using the symmetric multi-domain structure.

Another characteristic of the present invention is that the storage capacitor "C" connected in parallel to the pixel electrode 131 is not formed on the common line 135 but on the gate line 113. Accordingly, because a line width of the common line 135 can be reduced, the aperture ratio of the liquid crystal panel can be further improved.

Another characteristic of the present invention is that the black matrix is not formed widely over the gate line and the common line, but the area of the black matrix is minimized by placing the black matrix only over the gate line and the first common electrode 133a and extending the black matrix over the regions where the liquid crystal is aligned abnormally.

Figure 8A:
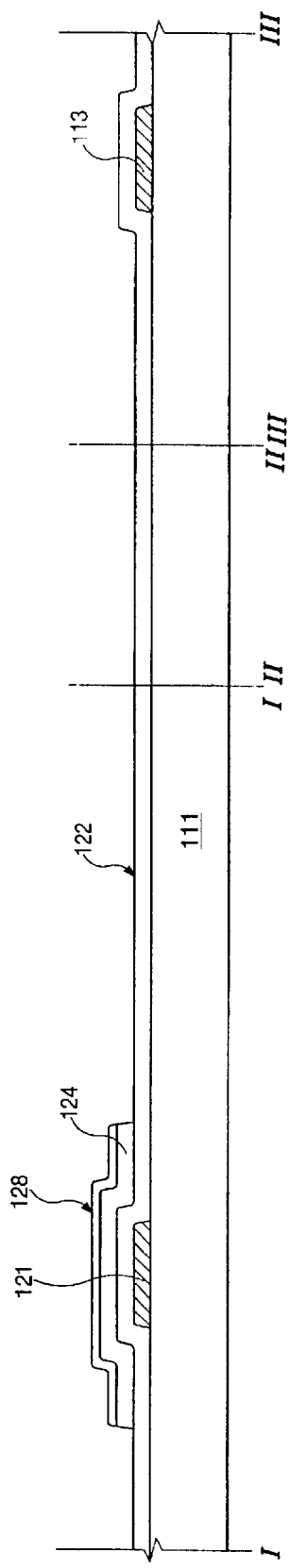
FIGS. 8A to 8C are cross-sectional views taken along I—I, II—II, III—III of FIG. 6 illustrating a fabricating sequence of an array substrate according to the present invention.
Figure 8B:
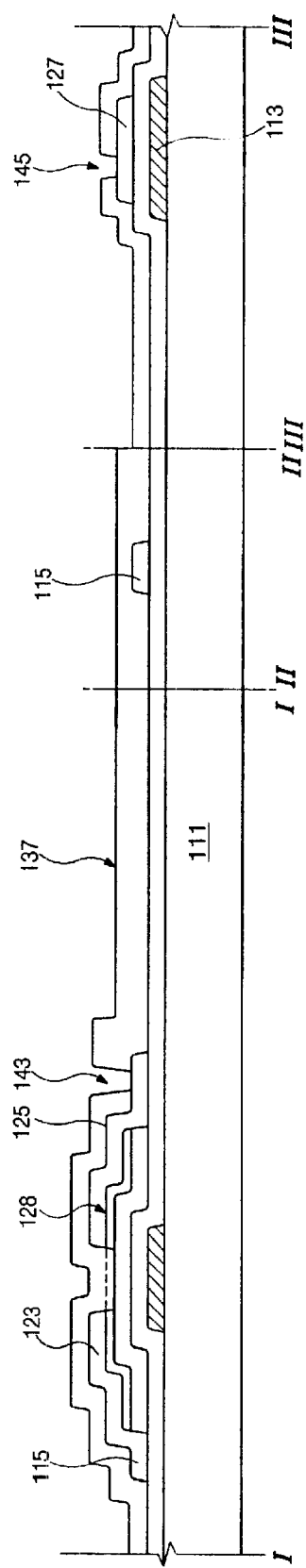
Figure 8C:
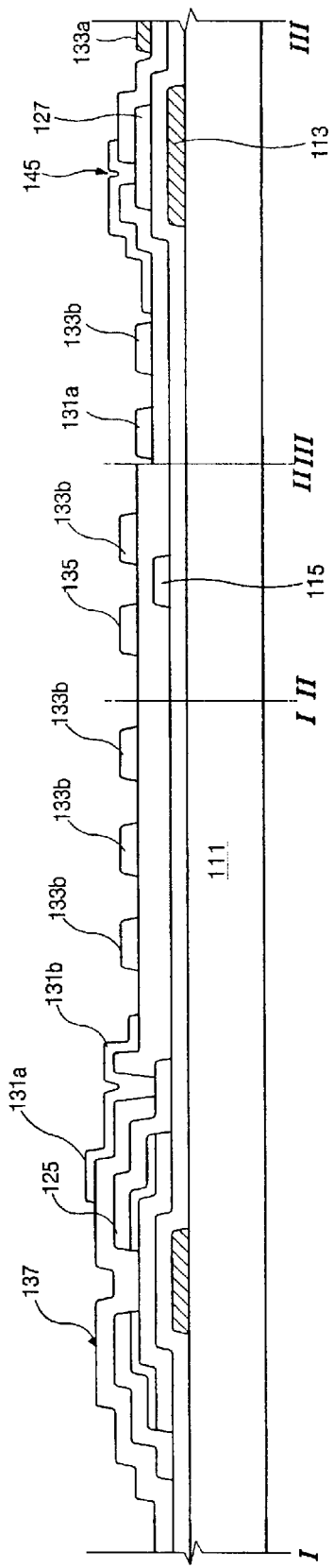

A fabricating sequence of the array substrate for a in-plane switching (IPS) mode liquid crystal display device will be described hereafter with reference to FIGS. 8A to 8C. FIGS. 8A to 8C are cross-sectional views taken along I—I, II—II, III—III of FIG. 6 illustrating a fabricating sequence of an array substrate according to the present invention. As shown in the figure, a gate line 113 is formed on the array substrate 111. A part of the gate line 113 is used as the gate electrode 121 in a first embodiment of the present invention. A gate insulating layer 122 is then formed by coating or depositing an organic insulating material or an inorganic insulating material on the gate line 113. The inorganic insulating material is selected from a group consisting of silicon oxide ($SiO_2$) and silicon nitride ($SiN_x$), for example and the organic insulating material is selected from a group consisting of benzocyclobutene (BCB) and acryl-based resin, for example. An active layer 124 is then formed on the gate insulating layer 122 using an amorphous silicon (a-Si:H) and an ohmic contact layer 128 is subsequently formed on the active layer using a doped amorphous silicon (n+a-Si:H or p+a-Si:H). The ohmic contact layer 128 may be alternatively formed by doping n+ions or p+ions on the active layer 124.

As shown in FIG. 8B, a data line 115 and a source and drain electrodes 123, 125 contacting the ohmic contact layer 128 are formed by depositing a conductive material selected from a group consisting of aluminum (Al), aluminum alloy (AlNd), tungsten (W), molybdenum (Mo), for example, on the array substrate and patterning it thereafter. The source electrode 123 is formed by extending the data line 115 from a crossing of the gate line 113 and the data line 115. The data line 115 is formed in substantially zigzag pattern. A metal layer 127 of the same material as the source and drain electrodes 123, 125 is formed on a part of the gate line 113. This electrode 127 serves as a second electrode of the storage capacitor "C". A part of the ohmic contact layer 128 between the source and drain electrode 123, 125 is removed. A passivation layer 137 is formed by coating or depositing an organic insulating material or an inorganic insulating material on the substrate. The inorganic insulating material is selected from a group consisting of silicon oxide ($SiO_2$) and silicon nitride (SiNx), for example and the organic insulating material is selected from a group consisting of benzocyclobutene (BCB) and acryl-based resin, for example. A drain contact hole 143 and a storage contact hole 145 exposing the drain electrode 125 and the second storage electrode 127 respectively are formed by etching parts of the passivation layer 137 on the drain electrode 125 and the second storage electrode 127 respectively.

As shown in FIG. 8C, a pixel electrode 131, a common line 135 and a common electrode 133 are formed by depositing a transparent conductive material selected from a group consisting of indium tin oxide (ITO) and indium zinc oxide (IZO), for example on the passivation layer 137 and patterning it thereafter. One end of the pixel electrode 131 contacts the drain electrode 125, and the other end of the pixel electrode contacts the second storage electrode 127. The pixel electrode 131 includes a first pixel electrode 131a contacting the drain electrode 125 spaced apart from and substantially parallel to the gate line 113 and a plurality of second pixel electrodes 131b extending away from the first pixel electrode 131a in a substantially zigzag pattern. The common electrode 133 includes a first common electrode 133a and a plurality of second common electrodes 133b. The first common electrode 133a extends from the common line 135 and parallel to the gate line 113. The plurality of second common electrodes 133b extends away from the first common electrode 133a and are arranged in an alternating order with the second pixel electrodes 131b. The common line 135 and one of the second common electrodes 133b partially overlap a part of the data line 115. The data line 115 serves to prevent light from irradiating to the region where the liquid crystal is aligned abnormally.

Figure 9:
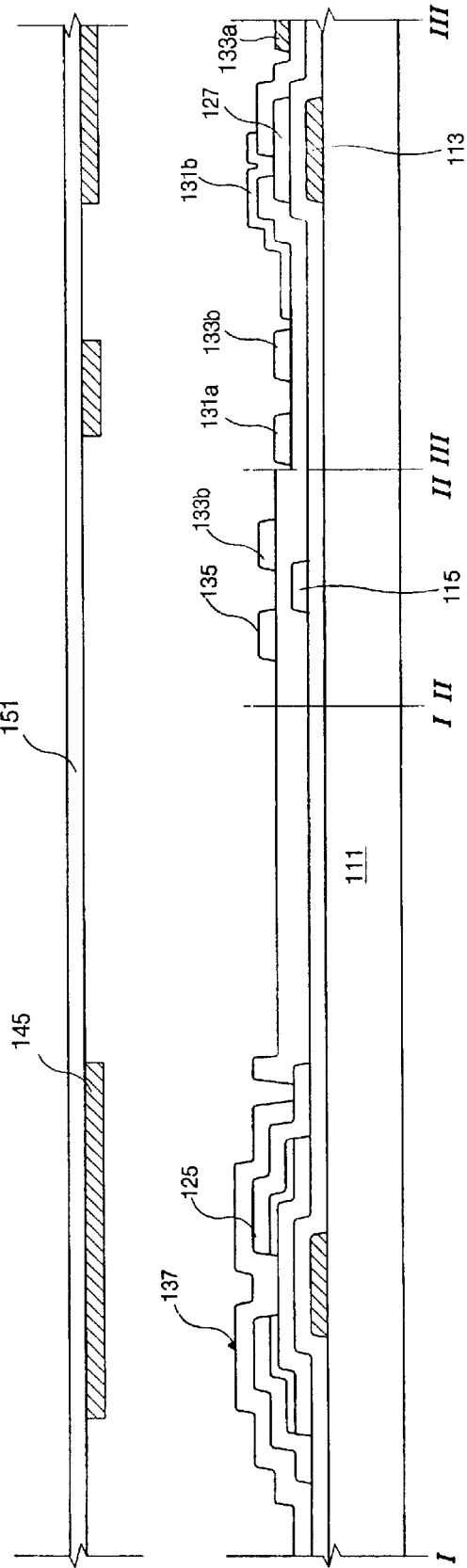
FIG. 9 is a view illustrating a liquid crystal panel according to the first embodiment of the present invention.

As shown in FIG. 9, a black matrix 145 is formed on the upper substrate 151 corresponding to the regions between the first common electrode 133a and the end of the second pixel electrode 131b and between the first pixel electrode 131a and the end of the second common electrode 133b where the liquid crystal is aligned abnormally. The black matrix is also formed over the thin film transistor and the storage capacitor "C", as shown in the figure. That is, a plurality of projections extend from the upper and lower part of the rectangular black matrix 145 covering the gate line 113 and the first common electrode 133a. Thus, the black matrix has a substantially rectangular shape. The protrusions are substantially rectangular-shaped. An aperture ratio can be increased by forming the black matrix in this way as compared with the method where the black matrix is widely formed to cover the gate line, the common line and the region where the liquid crystal is aligned abnormally. Because the black matrix still needs to be formed over the gate line according to the first embodiment of the present invention, an alignment margin of the upper and lower substrate should be considered.

Figure 10:
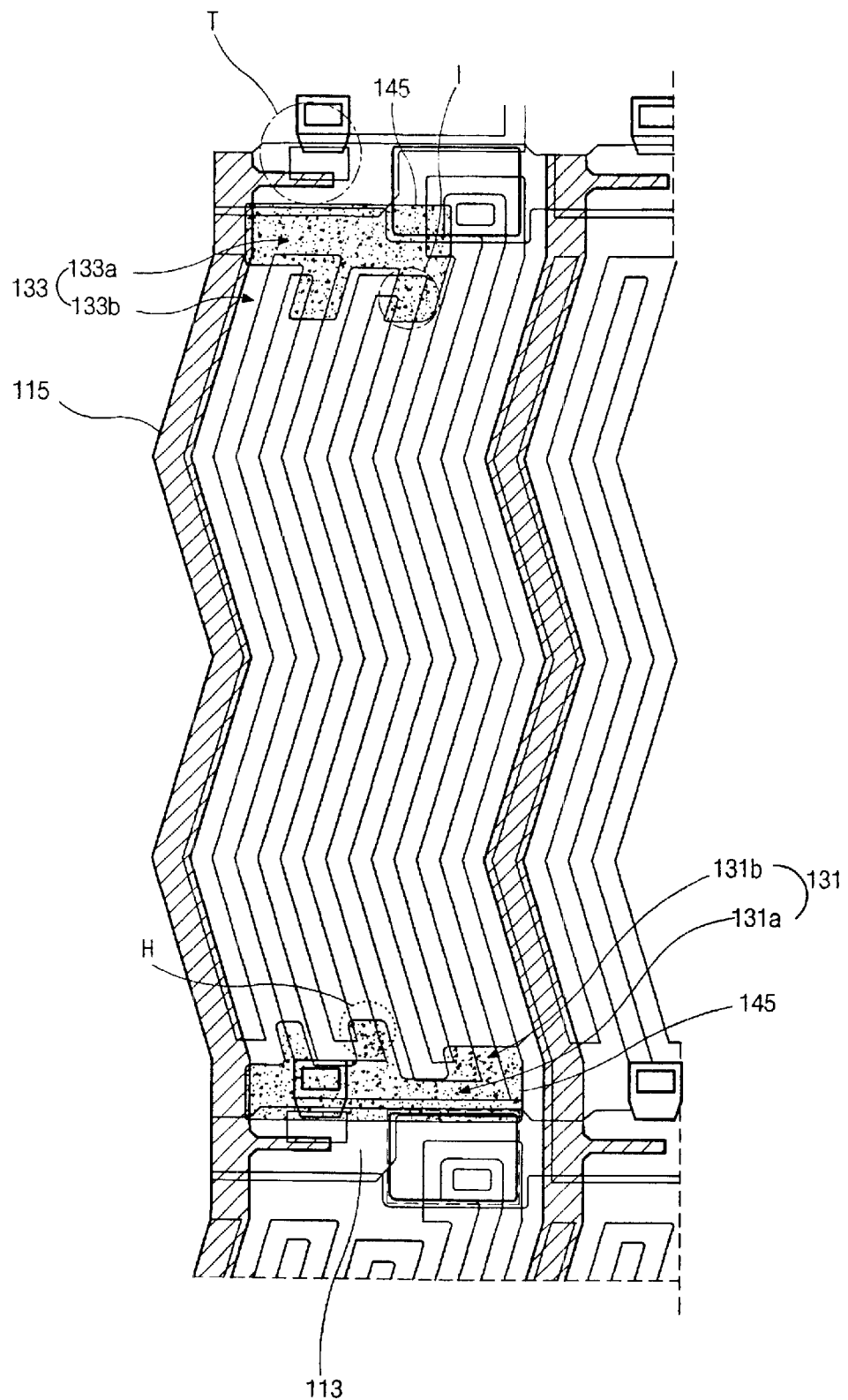
FIG. 10 is a plan view illustrating a part of an array substrate according to another embodiment of the present invention.

The second embodiment of the present invention that has an improved black matrix will be described hereinafter with reference to FIG. 10. FIG. 10 is a plan view illustrating a part of an array substrate according to another embodiment of the present invention. As shown in the figure, the black matrix 145 does not to cover the whole area of the gate line 113 and the first common electrode 133a, but covers only regions between the first pixel electrode 131a and one end of the second common electrode 133b and between the first common electrode 133a and one end of the second pixel electrode 131b where liquid crystal is aligned abnormally. Because the black matrix 145 is not formed over the gate line 113 and the first common electrode 133a, the black matrix 145 may be formed by using the same material as that of the gate line 113 or the data line 115 and by patterning it simultaneously with the gate line or the data line during the forming process of the gate line 113 or the data line 115. The black matrix 145 may be formed by extending the gate line 113 or the data line 115. Alternatively, the black matrix 145 may be formed independent of the gate line 113 and the data line 115. Because the black matrix does not need to be formed on the upper substrate according to this embodiment, the alignment margin does not need to be considered. Furthermore, an improved aperture ratio can be obtained. Accordingly, the present invention improves the brightness that was a weak point of in-plane switching (IPS) mode liquid crystal display device.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device, comprising:
    first and second substrates;
    a gate line and a data line defining a pixel region on the first substrate;
    a common line on the first substrate;
    a thin film transistor at a crossing portion of the gate line and the data line;
    a first pixel electrode and a plurality of second pixel electrodes on the first substrate;
    a first common electrode and a plurality of second common electrodes on the first substrate;
    a black matrix layer on the second substrate, the black matrix layer having a substantially rectangular shape between the first pixel electrode and one end of the second common electrode; and
    a liquid crystal layer between the first substrate and the second substrate.

2. The device of claim 1, wherein the common line is partially overlapped by the data line.

3. The device of claim 1, wherein the thin film transistor includes gate, source, and drain electrodes.

4. The device of claim 1, wherein the pixel and common electrodes include a transparent conductive material.

5. The device of claim 4, wherein the transparent conductive material is one of indium tin oxide (ITO) and indium zinc oxide (IZO).

6. The device of claim 1, wherein the common line and the data line have a substantially zigzag shape.

7. The device of claim 1, wherein the pixel and common electrodes have a substantially zigzag shape.

8. The device of claim 1, wherein the black matrix layer is between one end of the second pixel electrode and the first common electrode.

9. The device of claim 1, further comprising a storage capacitor on the gate line.

10. The device of claim 1, further comprising a passivation layer on the thin film transistor.

11. The device of claim 10, wherein the common and pixel electrodes are formed on the passivation layer.

12. A method for fabricating an in-plane switching liquid crystal display device, comprising:
    forming a gate line and a data line defining a pixel region on a first substrate;
    forming a common line on the first substrate;
    forming a thin film transistor at a crossing portion of the gate line and the data line;
    forming a first pixel electrode and a plurality of second pixel electrodes on the first substrate;
    forming a first common electrode and a plurality of second common electrodes on the first substrate;
    forming a black matrix layer on the second substrate, the black matrix layer having a substantially rectangular shape between the first pixel electrode and one end of the second common electrode; and
    forming a liquid crystal layer between the first and second substrates.

13. The method of claim 12, wherein the pixel and common electrodes include a transparent conductive material.

14. The method of claim 13, wherein the transparent conductive material is one of indium tin oxide (ITO) and indium zinc oxide (IZO).

15. The method of claim 12, wherein the common line and the data line have a substantially zigzag shape.

16. The method of claim 12, wherein the pixel and common electrodes have a substantially zigzag shape.

17. The method of claim 12, wherein the black matrix layer is between one end of the second pixel electrode and the first common electrode.

18. The method of claim 12, further comprising the step of forming a storage capacitor on the gate line.

19. The method of claim 12, further comprising the step of forming a passivation layer on the thin film transistor.

20. The method of claim 19, wherein the common and pixel electrodes are formed on the passivation layer.

21. An in-plane switching liquid crystal display device, comprising:
first and second substrates;
a gate line and a data line defining a pixel region on the first substrate;
a common line on the first substrate;
a thin film transistor at a crossing portion of the gate line and the data line;
a first pixel electrode and a plurality of second pixel electrodes on the first substrate;
a first common electrode and a plurality of second common electrodes on the first substrate;
a black matrix layer on the first substrate, the black matrix layer being formed between the first pixel electrode and one end of the second common electrode; and
a liquid crystal layer between the first substrate and the second substrate.

22. The device of claim 21, wherein the common line is partially overlapped by the data line.

23. The device of claim 21, wherein the thin film transistor includes gate, source, and drain electrodes.

24. The device of claim 21, wherein the pixel and common electrodes include a transparent conductive material.

25. The device of claim 24, wherein the transparent conductive material is one of indium tin oxide (ITO) and indium zinc oxide (IZO).

26. The device of claim 21, wherein the common line and the data line have a substantially zigzag shape.

27. The device of claim 21, wherein the pixel and common electrodes have a substantially zigzag shape.

28. The device of claim 21, wherein the black matrix layer is between one end of the second pixel electrode and the first common electrode.

29. The device of claim 21, wherein the black matrix layer is on the same plane as the gate line.

30. The device of claim 21, wherein the black matrix layer is on the same plane as the data line.

31. The device of claim 21, further comprising a passivation layer on the thin film transistor.

32. The device of claim 31, wherein the common and pixel electrodes are formed on the passivation layer.

33. An in-plane switching liquid crystal display device, comprising:
first and second substrates;
a gate line and a data line defining a pixel region on the first substrate;
a common line on the first substrate;
a thin film transistor at a crossing portion of the gate line and the data line;
a first pixel electrode and a plurality of second pixel electrodes on the first substrate;
a first common electrode and a plurality of second common electrodes on the first substrate;
a black matrix layer on the second substrate, the black matrix layer having a substantially rectangular shaped protrusions extending from the black matrix to an area of disclination to prevent light from passing through the area of disclination; and
a liquid crystal layer between the first substrate and the second substrate.

34. The device of claim 33, wherein the substantially rectangulate shaped protrusion extends to an area between the first pixel electrode and one end of the second common electrode.

35. The device of claim 33, wherein the rectangular shaped protrusion is a parallelogram that is slanted with respect to the black matrix.

36. A method for fabricating an in-plane switching liquid crystal display device, comprising:
forming a gate line and a data line defining a pixel region on a first substrate;
forming a common line on the first substrate;
forming a thin film transistor at a crossing portion of the gate line and the data line;
forming a first pixel electrode and a plurality of second pixel electrodes on the first substrate;
forming a first common electrode and a plurality of second common electrodes on the first substrate;
forming a black matrix layer on the second substrate, the black matrix layer having a substantially rectangular-shaped extending from the black to an area of disclination to prevent light from passing through the area of disclination; and
forming a liquid crystal layer between the first and second substrates.

37. The method of claim 36, wherein the substantially rectangular-shaped protrusion extends to an area between the first pixel electrode and one end of the second common electrode.

38. The method of claim 36, wherein the rectangular shaped protrusion is a parallelogram that is slanted with respect to the black matrix.

* * * * *